United States Patent [19]

Wrobley et al.

[11] Patent Number: 4,497,117

[45] Date of Patent: Feb. 5, 1985

[54] SLOPE COMPENSATING ANGLE GAUGE

[76] Inventors: A. Ray Wrobley; James H. Sullivan, both of P.O. Box 1471, Sedona, Ariz. 86336

[21] Appl. No.: 531,076

[22] Filed: Sep. 12, 1983

[51] Int. Cl.³ ............................................... G01C 3/00
[52] U.S. Cl. .......................................... 33/276; 33/277
[58] Field of Search ........................... 33/276, 277, 285

[56] References Cited

U.S. PATENT DOCUMENTS

| | | | |
|---|---|---|---|
| 2,090,658 | 8/1937 | Zak | 33/277 |
| 3,409,987 | 11/1968 | New | 33/277 |
| 3,908,281 | 9/1975 | Fox | 33/276 |
| 4,219,939 | 9/1980 | Ture | 33/277 |

FOREIGN PATENT DOCUMENTS

| | | | |
|---|---|---|---|
| 166672 | 9/1950 | Austria | 33/276 |
| 298537 | 6/1919 | Fed. Rep. of Germany | 33/276 |

*Primary Examiner*—Willis Little
*Attorney, Agent, or Firm*—Herbert L. Martin

[57] ABSTRACT

The "Cruiser's Crutch" is a slope correcting basal area angle gauge to be used in variable plot sampling for determining basal area in square feet per acre. It incorporates the critical angle for the 10, 20, 30 and 40 basal area factors. This gauge enables the forester or timber cruiser to make the same basal area measurements that would normally require a critical angle gauge for each factor chosen and at the same time compensates for slopes of from zero to ninety percent. The user selects the factor desired and then holds the instrument a fixed distance from his eye, as determined by the larger balls on the attached charin. The larger ball nearest the angle gauge is for 40 factor measurements; the next larger ball, 30 factor; the third, 20 factor and the last for ten factor measurements. (Other basal area factors between 10 and 40 can be easily added if desired.) User then rotates 360° around a point, keeping his eye over the point at all times and the gauge perpendicular to the slope. Any tree that is large enough to subtend the fixed critical angle of the gauge is considered "in" and is tallied. All trees tallied around the circle are then multiplied by the factor number chosen; the result being equal to basal area per acre.

4 Claims, 3 Drawing Figures

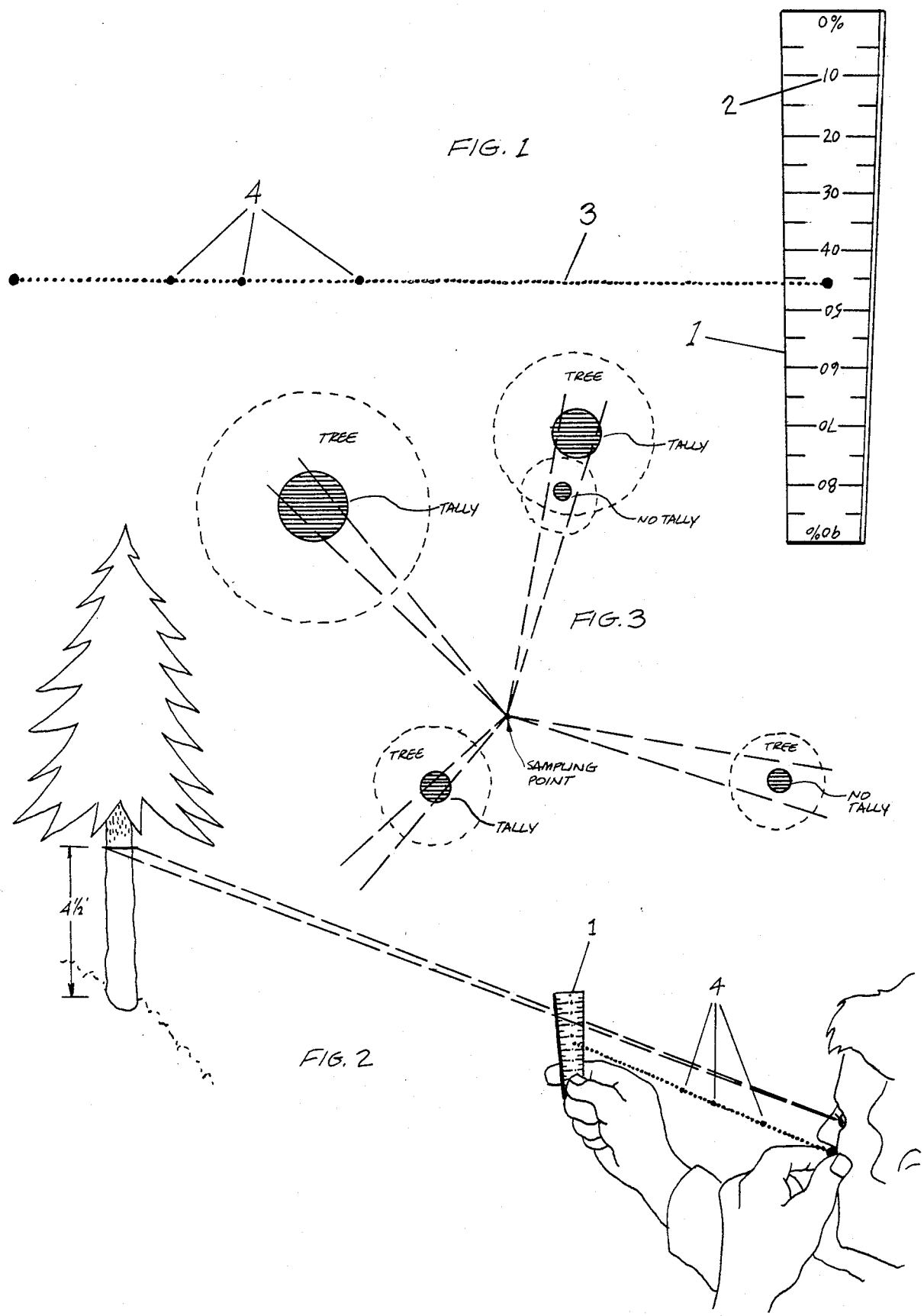

SLOPE COMPENSATING ANGLE GAUGE

This invention relates to a gauge used in the forestry industry to take an inventory of timber in a given forested area. It enables the user, called a "cruiser" in the industry, to rapidly and expeditiously inventory the basal area of timber over extensive areas of standing timber in either level or mountainous regions. The gauge is accordingly called a "Cruiser's Crutch" by users in the field, and it has acquired a specialized use under a relatively new concept in forest inventory procedures as used in the United States. It is the purpose of the present gauge to accurately determine what is called a basal area (BA) for each area surveyed. Since the theory of variable plot cruising is quite involved, a detailed discussion here would be impractical as not directly concerning the present invention. Suffice it to say that this theory is widely accepted and extensively used in the forestry industry, and that it enters into the picture here mainly as background evidence of the specialized utility of the invention. What the gauge does is make possible the speedy determination of the basal area per acre, a factor which is important to the application of this theory in forest inventory procedures. For a better understanding of the above-mentioned theory, reference is hereby made to a copyrighted (1971) book entitled VARIABLE PROBABILITY SAMPLING, which contains a chapter entitled "Variable Plot Cruising" written by J. R. Dilworth and J. F. Bell, and published in 1975 by the Oregon State University Bookstores Inc., Corvallis, Oreg.

The closest known pertinent prior art is:
Merritt   U.S. Pat. No. 1,455,347   May 15, 1923
von Buchau (Ger)   30,422   Feb. 9, 1885

Variable plot cruising is accordingly admittedly old in the art, but thus far the use therefor has been dependent on delicate and expensive sight gauges to determine the basal area. The variable plot or point method requires that the cruiser use some type of instrument which will permit him to ocularly project a predetermined angle. The most common of such instruments employed are horizontal angle gauges, or those using one or more wedge prisms, which are not only expensive, but unable to withstand the rough usage which the instrument is subjected as the cruiser climbs around over the rough terrain where much of the timber exists. Furthermore, they are useful for only horizontal observations, and consequently not suitable for use on slopes.

It is accordingly an object of the invention to provide a sight angle-gauge which is not only inexpensive to make, but of sufficiently rugged construction to withstand the rough usage to which it will be subjected in normal use.

A further object of the invention is to provide a sight angle-gauge that automatically compensates for the percentage of slope of the terrain where the device is being used.

Further objects and advantages of the invention will become apparent from the following description, taken in conjunction with the accompanying drawing wherein:

FIG. 1 shows the gauge and its simple construction,
FIG. 2 shows how the instrument is used in the determination of the dimension of a possibly inacessible tree,
FIG. 3 illustrates, with its legendary matter, how point sampling is done in the field.

Considering FIG. 1, 1 designates the sight scale piece which is calibrated as at 2 in degrees of slope varying from 0 to 90%. This scale piece is preferably made of a transparent plastic (such as "Lexan"), which is not easily broken or permanently deformed, and which is given a taper that is a trigonometric function of the slope of the terrain where the device is to be used. Thus the width of the sight scale piece, at any given slope calibration point, will correspond to the slope of the terrain under consideration. Attached to the middle of the gauge scale piece is a flexible cord or thong (preferably a small ball-chain), having thereon a plurality of knots or enlarged indicator beads 4 for quickly determining the distance the scale piece is to be held from the observer's eye. These enlarged indicators constitute the Basal Area Factor or (BAF). This is a factor arbitrarily chosen by the cruiser who is familiar with the theory of variable plot cruising and used by him in later computations. The farther the sight scale piece is held from the eye, the smaller will be the angle subtended by the scale piece itself, as well as the object observed. Further discussion of the spacing of these indicator beads will be found hereinafter in the discussion of the operation of the device.

OPERATION

To use the "Cruiser's Clutch," select the appropriate basal area factor (BAF) desired, and determine the slope to the nearest 5%. With your eye over the sample point, hold the appropriate distance bead under your eye, lightly touching the cheek. Extend the scale away from the eye until the cord is taut. With the scale piece held perpendicular to the slope and your eye over the observation point, line up the tree to be measured with the appropriate slope percent line on the gauge. Any tree that is large enough at dbh (diameter at breast height—usually 4.5 feet above the ground) to subtend the fixed critical angle of the gauge is considered "in," and is tallied. Then rotate 360° about the sample point and repeat the procedure for all trees that might be tally trees. The number of trees tallied times the basal area factor used is the basal area for that sample point.

What is claimed is:
1. A slope-compensating basal area angle gauge for forest inventory procedure comprising a (slope-conpensated) sighting scale piece which comprises an elongated, longitudinally tapered strip of material with calibrations thereon which, together with the degree of taper of the scale piece, constitute trigonometric functions of the slope percentage of the terrain over which the observation is being made, said scale piece having attached thereto a flexible cord or thong provided with spaced indicator elements for determining the spacing of the scale from the observer's eye, whereby the sighting scale can be held a fixed predetermined distance from the observer's eye while sighting on a tree, the dimension of which is to be determined.

2. The structure of claim 1 wherein the sighting scale is made of a transparent material, whereby the observer is enabled to quickly and clearly identify a tree or other object, the dimension of which is too small to subtend an occularly projected angle which is determined by the point of observation as an apex, and the opposite edges of the tapered scale piece.

3. The structure of claim 1 wherein the sighting scale is made of a semi-rigid transparent plastic material.

4. The structure of claim 1, wherein the longitudinally tapered strip of material comprising the scale piece has longitudinally spaced slope-calibration marks extending thereacross normal to the length of said strip, designating slopes varying from zero to increasingly greater degrees lengthwise of said scale, whereby an object on sloping terrain, observed on a line of sight across that calibration mark designating the slope between that object and the observer will subtend the same proportion of the ocularly projected sight angle as if the object were at the same level as the observer and the sighting were made across the zero calibration mark on said scale.

* * * * *